April 30, 1968   J. A. SCALETTA ET AL   3,380,282
METHOD AND APPARATUS FOR FORMING BLANKS
Filed Aug. 9, 1965   4 Sheets-Sheet 4
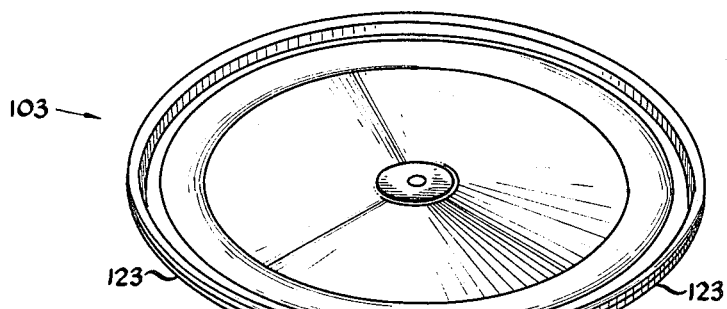
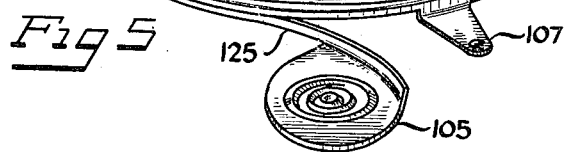
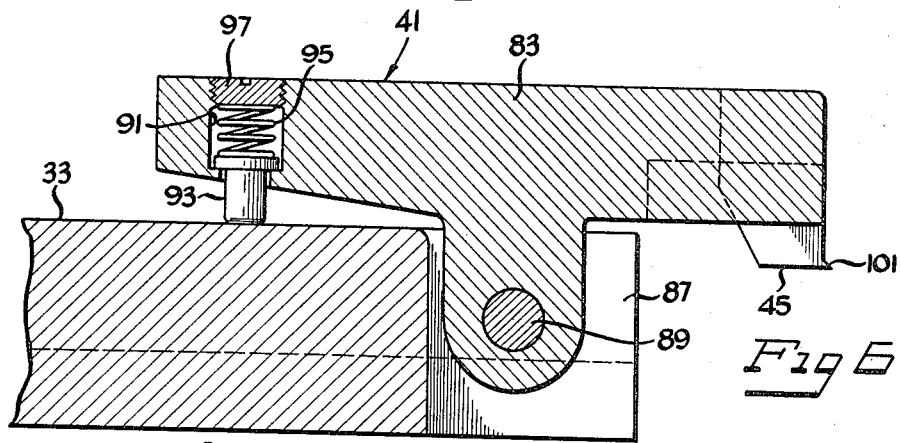
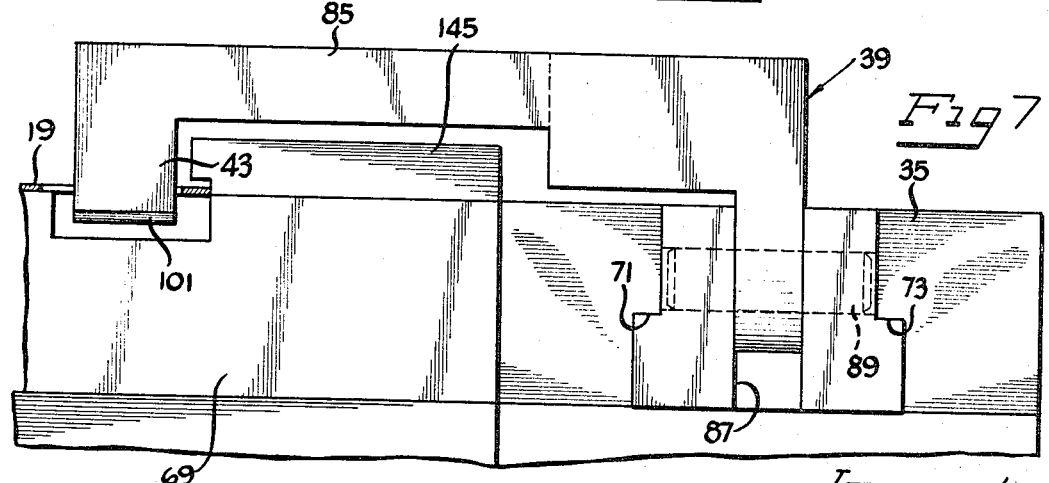
INVENTORS
JOSEPH A. SCALETTA
ROLAND E. MILLER
JOHN VALEK

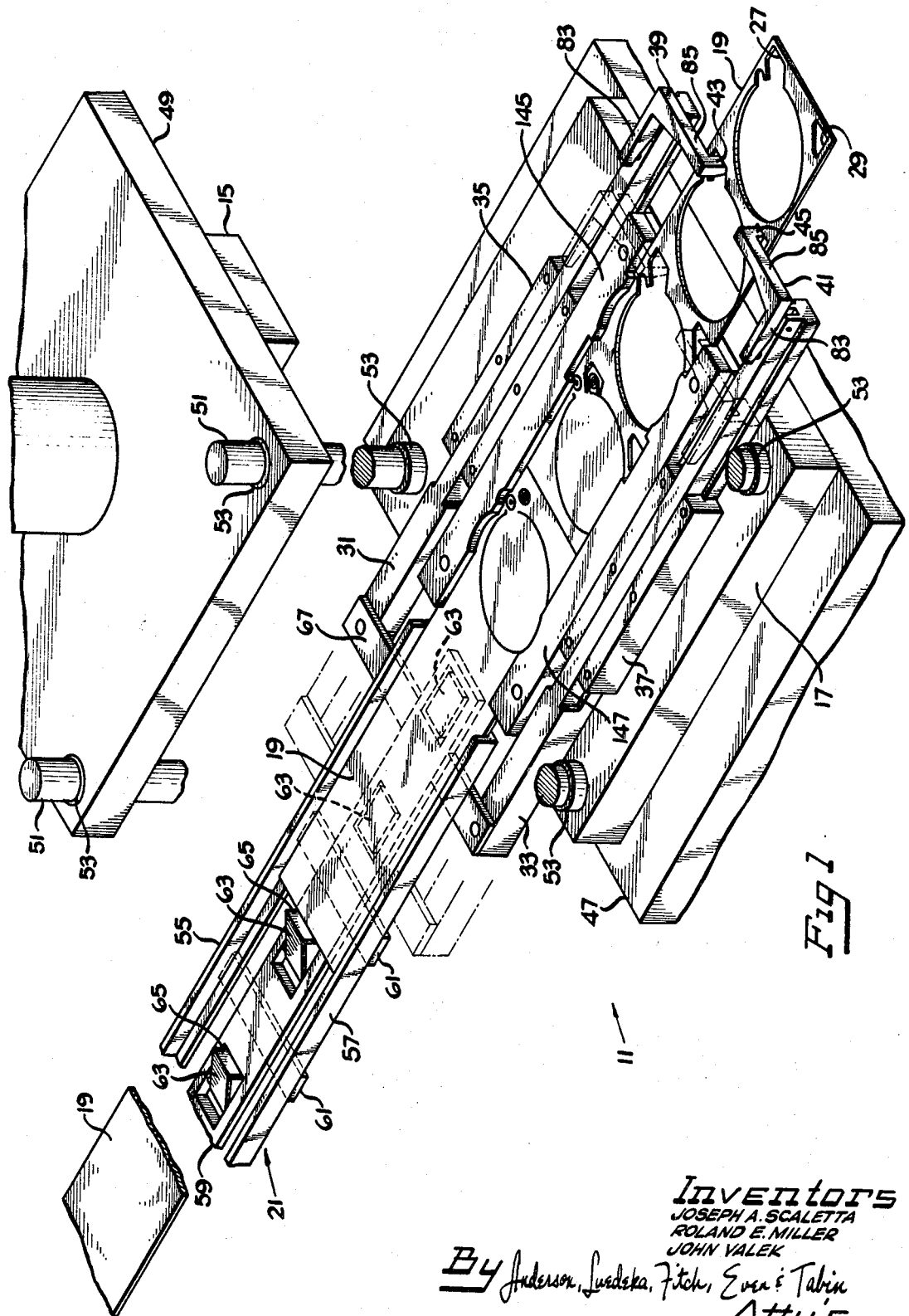

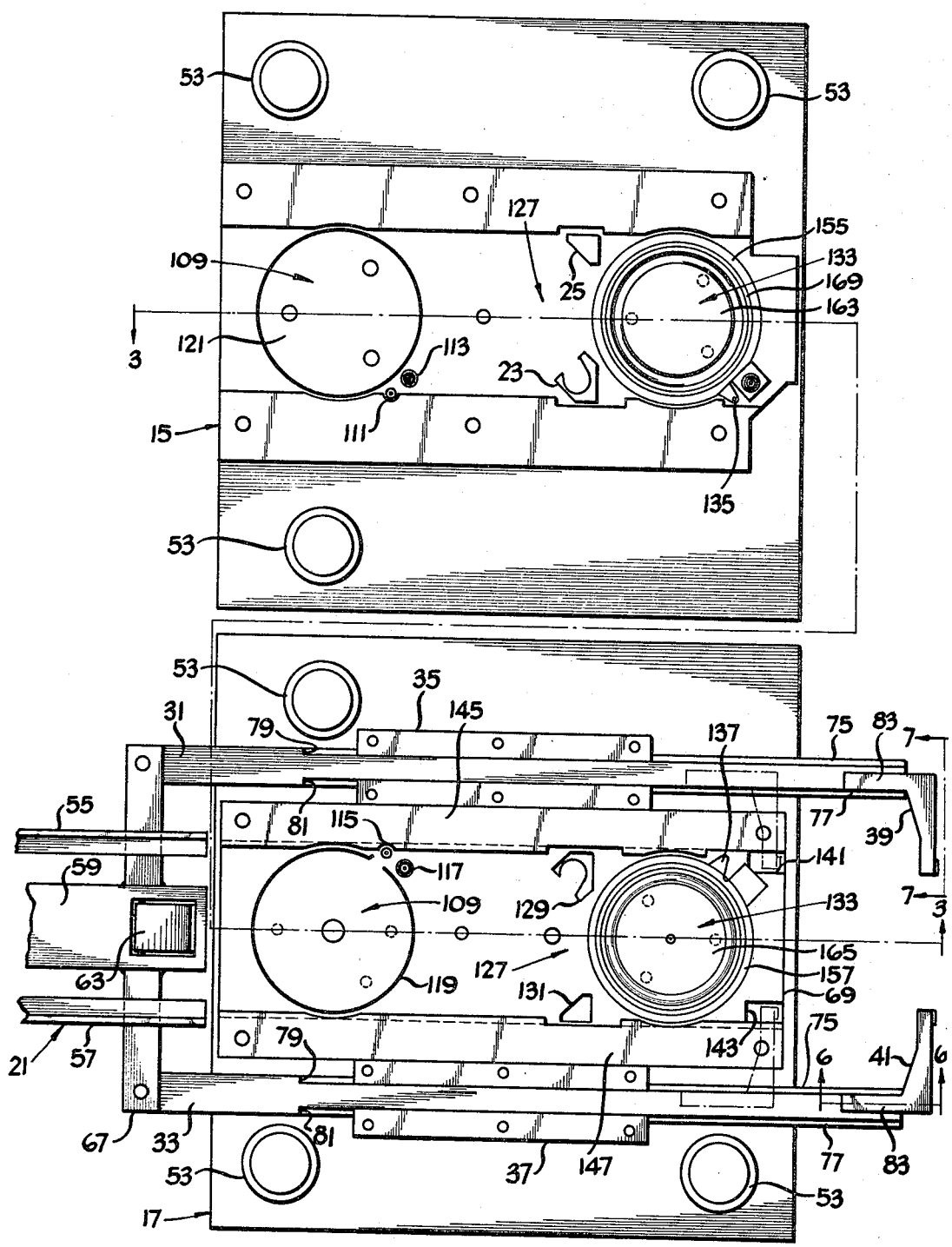

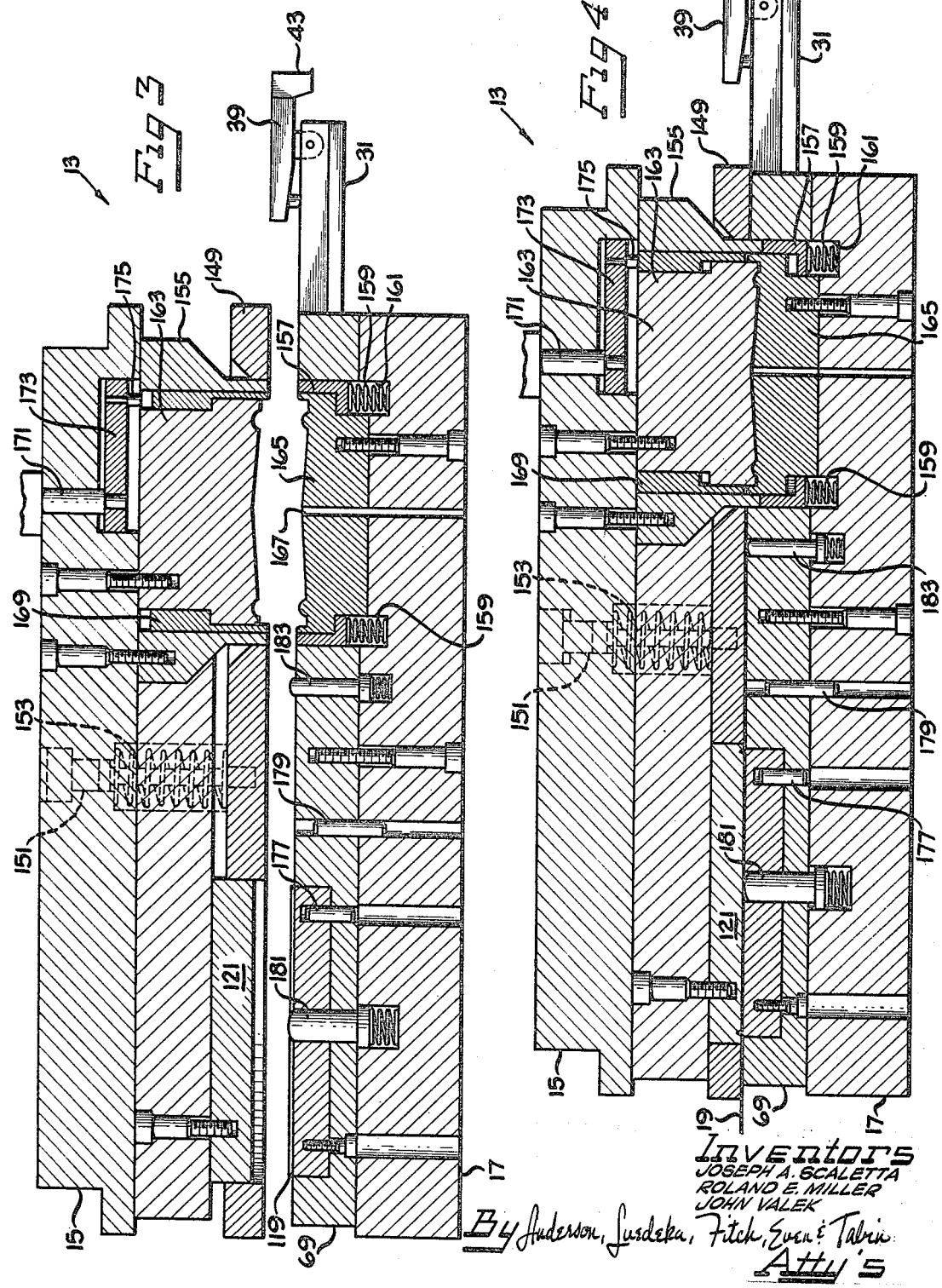

United States Patent Office 3,380,282
Patented Apr. 30, 1968

3,380,282
METHOD AND APPARATUS FOR
FORMING BLANKS
Joseph A. Scaletta, Chicago, Roland E. Miller, Orangeville, and John Valek, Cicero, Ill., assignors to National Dairy Products Corporation, Chicago, Ill., a corporation of Delaware
Filed Aug. 9, 1965, Ser. No. 478,295
9 Claims. (Cl. 72—335)

ABSTRACT OF THE DISCLOSURE

Method and apparatus for performing work on strip stock, in which the strip is an uncoiled essentially planar form and is advanced through one or more work stations by a pushing force applied at its trailing edge and by a pulling force applied against the edge of an aperture provided in the strip.

---

This invention relates generally to a method and apparatus for continuously forming blanks from stock material, and more particularly it relates to a method and apparatus for advancing stock material into a stamping press in correct registry with the press die set.

In the high speed continuous manufacture of articles such as thin metal covers, lids, and containers in a stamping press, the stock material is intermittently advanced into the press between each stroke of the press by a suitable feed mechanism. A principal problem encountered in the operation of high speed stamping apparatus is that of insuring correct registry of the stock with the press die set. Heretofore, stock stops, in the form of biased pins or pawls carried by the die set, were conventionally used to insure correct registry between the stock and the die set. However, stock stops are not generally suitable for high speed continuous stamping operations, and it is necessary to employ some other means for insuring correct registry between the stock and the die set.

Obtaining a correct registry between the stock and the die set is particularly important where a portion of the stock is printed, or contains other indicia, which must appear at a specific location on the blank produced by the stamping operation. For example, in the manufacture of lids for containers or the like from multicolor printed aluminum sheet stock, the stock must register within close tolerances with the die set in order to provide an acceptable lid. The necessity of insuring correct registry between the stock and the die set is of further importance when the die set is a progressive die set; that is, a die set wherein a plurality of operations are performed on the stock at different stations during each stroke of the press, the sum of the operations carried out at the different stations producing the finished blank. In such instances, advancement of the stock from station to station must be done within close tolerances in order that the areas of the blank formed at preceding stations will mate with areas of the blank formed at succeeding stations.

Another problem that occurs in high speed continuous stamping operations is that of forming blanks from stock material which is in the form of relatively short strips, for example, from two to five feet in length, as opposed to a continuous web. Heretofore, it has not been possible to employ a progressive die set in a high speed strip feed press since there has been no convenient means for feeding the strip stock into the progressive die set. This is due to the fact that after the trailing edge of the strip stock enters the progressive die set there is no positive control over the feeding of the strip from station to station within the die set.

It is a principal object of the present invention to provide an apparatus for the continuous formation of blanks from stock material. Another object is to provide an apparatus for continuously advancing stock material into a stamping press in correct registry with the press die set. Still another object is to provide a die set for use in a stamping press which includes means for feeding the stock into the press in correct registry with the die set. An additional object is to provide a means for feeding strip stock material into a stamping press having a progressive die set. A still further object is to provide a method for continuously advancing strip stock material into a forming apparatus in correct registry with the forming members.

These and other objects of the invention will become more apparent from the following detailed description and from the drawings of which:

FIGURE 1 is a partial schematic perspective view of a stamping press and associated feed mechanism illustrating a specific embodiment of the invention;

FIGURE 2 is an opened view of a specific progressive die set embodying certain features of the invention;

FIGURE 3 is an elevational sectional view taken along line 3—3 of FIGURE 2 showing the die set in an open position;

FIGURE 4 is similar to FIGURE 3 and shows the die set in a fully closed position with a piece of stock material therebetween;

FIGURE 5 is a perspective view of a lid manufactured by the die set shown in FIGURES 1 to 4;

FIGURE 6 is a sectional view taken along line 6—6 of FIGURE 2; and

FIGURE 7 is a sectional view taken along line 7—7 of FIGURE 2.

The present invention is directed to a method and apparatus for continuously forming blanks from stock material including means for delivering strips of stock material to a forming apparatus, means for forming blanks from the strip stock material, and means for advancing the strip material through the forming apparatus in correct registry therewith.

Very generally, having reference to the accompanying drawings, there is shown a specific embodiment of a stamping press 11 incorporating various features of the invention. As used herein, the term "forward" is in the direction of travel of the strip of stock material which, as seen in FIGURE 1, is from left to right. A progressive die set 13, which includes a punch holder 15 and a die shoe 17, is mounted on the stamping press 11 for continuously stamping container lids from a plurality of strips 19 of stock material, and a reciprocal feed carriage 21 is supported adjacent the die set 13 for feeding the strips of stock material 19 into the die set. A pair of punches 23, 25 (FIG. 2) are carried by the die set 13 for forming apertures 27, 29 (FIG. 1) adjacent opposed lateral edges of the stock during operation of the stamping press. A pair of parallel slides 31, 33 are attached adjacent their rearward end to the forward end of the feed carriage 21. The slides 31, 33 extend beyond the feed carriage 21 and are slidably mounted in gibs 35, 37 carried by the die shoe 17. The slides 31, 33 are of a length such that they extend beyond the die set 13, and arms 39, 41 are pivotally supported adjacent the forward ends of each of the slides 31, 33 respectively. Feed fingers 43, 45 are provided on the arms 39, 41 for engagement with the apertures 27, 29 formed in the stock 19 by the punches 23, 25 to positively advance the stock forward in proper registry with the die set 13 when the feed carriage 21 is reciprocated.

Referring now to the drawings in detail, there is shown in FIGURE 1 a partial schematic perspective view of a strip feed stamping press 11 embodying various features of the invention. For purposes of illustration, the conventional support structure and power unit of the press are not shown. Forming means such as a die set, indicated generally by numeral 13 (FIG. 3), are carried by the press in a usual manner. The die set includes a lower die shoe 17 affixed to the bed 47 of the press and an upper punch holder 15 attached to a ram 49 of the press. The punch holder 15 and die shoe 17 are maintained in proper alignment by guide pins 51 (FIG. 1) which are slidably received in suitable bushings 53. It is understood that the illustrated die set may be supported in and utilized with various types of conventionally available stamping presses.

Means are provided for feeding the strips of stock material into the die set. One such means, as best seen in FIGURE 1, includes the press feed carriage 21 which is supported for reciprocal movement adjacent the entrance to the press die set 13 by a suitable support structure (not shown). The feed carriage 21 may be reciprocated by any suitable power source, or by the press power source, as desired. The feed carriage 21 generally comprises a pair of longitudinally extending L-shaped guide members 55, 57 and a central longitudinally extending support plate 59 carried by suitable cross members 61. The L-shaped guide members 55, 57 define a channel of a width slightly greater than the width of the stock material 19, and support the lateral edges thereof. A plurality of upwardly biased pusher members 63, having a flat end face 65, are carried in longitudinally spaced relationship by the support plate 59 for engaging the trailing edge of the strip 19 which may be delivered onto the feed carriage 21 from a suitable magazine (not shown). The pusher members 63 are spaced apart along the support plate a distance equal to the length of the stroke of the feed carriage 21 so that, as the feed carriage 21 reciprocates back and forth, successive pusher members 63 will engage the trailing edge of the strip 19 to feed the strip 19 into the die set 13, as more fully discussed hereinafter.

The apparatus also includes means for advancing the strip stock material through the die set independently of the pushing action of the feed carriage. In the illustrated embodiment shown in FIGURE 1, the advancing means includes parallel slides 31, 33 attached adjacent their rearward ends to the forward end of the feed carriage 21 by means of a suitable brace member 67. The parallel slides extend generally longitudinally of the die set 13 and are of a length so as to extend beyond the die set 13. The slides 31, 33 are slidably mounted in the gibs 35, 37 which are affixed to the die shoe 17 abutting opposite longiutdinal edges of a die block 69 (FIGS. 3 and 4) which carries various forming dies as discussed hereinafter. The gibs 35, 37 are provided with suitable flanges 71, 73 (FIGURE 7) which cooperate with corresponding flanges 75, 77 (FIG. 2) on the slides 31, 33 to retain the slides in proper alignment. The flanges 75, 77 on the slides 31, 33 terminate in walls 79, 81 which act as stops to arrest the forward movement of the slides 31, 33.

The advancing means includes means for engaging an aperture in the stock material. As seen in FIGURES 1 and 2, the engaging means may comprise generally L-shaped arms 39, 41 pivotally mounted adjacent the forward ends of each of the slides 31, 33. Each L-shaped arm comprises an axial element 83 which extends generally axially of the slide and a transverse element 85 attached to the forward end of the axial element 83 which extends inwardly of the space between the slides.

Referring to FIGURES 6 and 7, each of the axial elements 83 is pivotally mounted in a slot 87 in the forward end of each of the slides 31, 33 by means of a suitable pivot pin 89. The rearward end of each axial element 83 is provided with a flanged aperture 91 which receives a correspondingly flanged button 93. A biasing spring 95 is retained within the aperture by means of a set screw 97 for biasing the button against the upper surface of the slide. The depending feed fingers 43, 45 are mounted on the inward end of the transverse elements 85, and each feed finger 43, 45 has a projecting lip 101 adjacent the lower forward edge thereof for engagement with the apertures 27, 29 formed in the stock material 19 by the punches 23, 25, as described hereinafter.

There is shown in FIGURE 2 an opened view of a specific die set 13 for use with the illustrated advancing means. The die set 13 is adapted to form a lid 103 of the type illustrated in FIGURE 5, which lid includes a tear strip tab 105 and a lift tab 107. Lids of this general type are particularly described and illustrated in United States Letters Patent No. 3,208,626.

The die set 13 illustrated in FIGURE 2 is a progressive die set and is adapted to perform three distinct stamping operations on each stroke of the press at three different stations within the die set. The die set generally comprises an upper punch holder 15 and a lower die shoe 17. A die block 69 (FIG. 2) is mounted on the die shoe 17 and a pair of notched guide rails 145, 147 (see FIGURE 7) are mounted adjacent the longitudinal edges of the die block 69 for receiving the longitudinal edges of the stock 19 to guide the stock through the die set during the stamping operation.

The first operation is carried out at a first station of the die set 13, generally indicated by numeral 109. At the first station 109, the punch holder 15 carries embossing punches 111 and 113, which cooperate with corresponding embossing dies 115 and, 117 carried by the die block 69 fixed to the die shoe 17, for forming corregated finger gripping areas on the lift tab 107 and the tear strip tab 105 respectively. A scoring ring 119 is carried by the die block 69, and a corresponding pressure pad 121 is carried by the punch holder 15 at station 109 for forming a line of weakness 123 in the stock 19 which delineates the tear strip 125 as shown in FIGURE 5.

The second operation performed by the die set 13 is carried out at the station generally designated by numeral 127 in FIGURE 2. At this station the punch holder is provided with the punches 23, 25, which cooperate with corresponding dies 129, 131 in the die block 69, for forming the apertures 27, 29 adjacent opposed lateral edges of the stock material 19. It can be seen that the punch 23 also operates to blank the tear strip tab from the stock 19 (see FIGURE 1).

The third station of the die set, indicated generally by numeral 133, blanks and forms the lid from the stock material 19 as more particularly pointed out below. The punch holder 15 carries a lift tab punch 135 which cooperates with a corresponding die 137 in the die block 69 for blanking the lift tab 107 from the stock 19 in conjunction with the mentioned blanking and forming operation. A punch 139 is also provided at the third station for engaging the tear strip tab 105, which was blanked from the stock material 19 at the second station 127, for retaining the tab 105 in the proper position during the blanking and forming operation. Additionally, the corners of the die block 69 are provided with notches 141, 143 which receive the feed fingers 43, 45, as later described, for engagement of the feed fingers 43, 45 with the apertures 27, 29 in the stock material 19.

Referring now to FIGURES 3 and 4, which are taken along line 3—3 of FIGURE 2, the particular illustrated construction and operation of the illustrated die set may be seen. It is noted that in the closed view of FIGURE 4, a strip of stock material is shown in the die set.

The punch holder 15 carries a spring biased stripper plate 149 affixed thereto in a conventional manner by a stripper bolt 151 and stripper spring 153. The stripper plate 149 engages the stock 19 on the downward stroke of the press to prevent shifting of the stock during the stamping operation, and when the die set is opened on the upward stroke of the press, the stripper plate 149 acts to free the lid blanked from the stock during the downward stroke of the press.

The scoring ring 119 and the pressure pad 121 are fixed to the die block and punch holder respectively by means of suitable bolts. The pressure pad urges the stock against the scoring ring to form the line of weakness 123 and the tear strip 125 (FIGURE 5).

An annular blanking punch 155 is secured to the punch holder 15 by means of suitable bolts for blanking the lids from the stock. A biased draw ring 157, which is biased upwardly by suitable springs 159, is carried in a flanged recess 161 in the die block in mating alignment with the blanking punch 157. A cylindrical forming punch 163 is secured to the punch holder by means of bolts concentrically within the annular blanking punch 155, and a mating cylindrical forming die 165, attached to the die shoe by bolts, is mounted within the annular drawing ring in the die block for forming the central portion of the lid 103. An air escape passageway 167 is provided in the forming die 165 and die shoe 17 to allow the escape of the air from beneath the stock material during the forming operation in order to prevent formation of bubbles or wrinkles in the lid.

An annular shedder 169 is slideably carried in the space between the blanking punch 155 and forming punch 163. The punch holder 15 carries an axially slideable knock-out pin 171 which is connected to a spider 173 which has suitable projections 175 depending therefrom which abut the annular surface of the shedder when the die set is in a closed position. A suitable cam or lever (not shown) carried by the press strikes the knock-out pin 171 on the upward stroke of the press and biases the shedder 169 downwardly thus insuring positive ejection of the formed lid from the die set.

The die set is provided with suitable dowels 177, 179 for positive alignment of the various parts which make up the die set, and is also provided with spring biased lifters 181, 183 for insuring that the stock is freed from the surface of the die block between each stroke of the press in order that the stock may be indexed forwardly by the feed fingers 43, 45 as will be described hereinafter.

For purposes of explanation, the operation of the stamping press and feed mechanism shown in the accompanying drawings will be explained with reference to the stamping of lids of the type shown in FIGURE 5 from a strip 19 of stock material of a length sufficient to form four lids therefrom. The strip 19 is delivered from the feed magazine (not shown) onto the reciprocating feed carriage 21 when the feed carriage is in its reawardmost position. In such position, the flat face 65 of the rearwardmost pusher member 63 abuts the trailing edge of the stock material 19. When the fed carriage 21 reciprocates forwardly, the pusher member 63 causes the strip 19 to be pushed into the die set. The length of travel of the feed carriage 21 is adjusted so that the strip 19 is introduced into the die set a distance equivalent to the area of the strip necessary to form one lid. At the end of the forward travel of the feed carriage the strip 19 is delivered to the first station 109 of the die set 13.

After the strip 19 is delivered to the first station 109, the stamping press 11 commences a first downward stroke and the embossing punches 111, 113 and corresponding dies 115, 117 emboss the corregated finger gripping areas on the tear strip tab 105 and the lift tab 107, and the score ring 119 and pressure pad 121 form the line of weakness 123 in the stock. During the downward stroke of the press, the feed carriage 21 reciprocates rearwardly. At the end of the rearward travel of the feed carriage, the next to last pusher member 63 frees the trailing edge of the strip 19 and is biased upwardly. The press then commences a first upward stroke during which time the feed carriage 21 reciprocates forwardly and the pusher member 63 pushes the strip forward from the first station 109 to the second station 127 of the die set 13. During the second downward stroke of the press, at the second station 127, the punches 23, 25 form apertures in the stock material, the punch 23 also blanking the tear strip tab from the stock, and at the first station 109 the embossing punches 111, 113 and dies 115, 117, and the score ring 119 and the pressure pad 121 form the above-described gripping areas on the tear tab 105 and the lift tab 107 and the line of weakness 123. At the same time the feed carriage again reciprocates rearwardly and the next pusher member clears the trailing edge of the stock. During the second upward stroke of the press, the feed carriage 21 again indexes the strip forward in the described manner to the third station 137 of the die set. During the third downward stroke of the press, at the third station, the die set blanks and forms the lid and at the same time the described operations are carried out at the first and second stations. During the third upward stroke of the press, the knockout pin 171 strikes the shedder 169 and ejects the formed lid 103 from the die set.

When the feed carriage reaches its rearwardmost position during the third downward stroke of the press, the feed fingers 43, 45 are in the dotted line position shown in FIGURES 1 and 2. In such position the feed fingers 43, 45 engage the apertures 27, 29 in the stock material (FIGURE 7) immediately adjacent the leading edge thereof which were formed on the second downward stroke of the press. At the same time the forwardmost pusher member 63 frees the trailing edge of the strip 19. Accordingly, during the next forward reciprocation of the feed carriage 21 the stock 19 is indexed forward by both the pusher member 63 and the feed fingers 43, 45. At the end of the forward travel of the feed carriage the pusher member 63 delivers the trailing edge of the stock 19 entirely within the die set. During the fourth downward stroke of the press and the corresponding rearward travel of the reciprocating feed carriage, the next strip of stock material is delivered onto the feed carriage.

At this point, after four complete cycles of the press with the feed carriage 21 in its rearwardmost position, the trailing edge of the strip 19 is wholly within the die set and the strip cannot be positivelly indexed forward within the diet set from the rear. However, the feed fingers 43, 45 engage the apertures 27, 29 when the feed carriage is in its rearward position and when the feed carriage 21 travels forward to index the next strip 19 to the first station 109 of the die set, the feed fingers 43, 45 pull the first strip 19 forward an equivalent distance from one station of the die set to the next station of the die set. The feed fingers 43, 45 continue to pull the strip of stock material through the die set during each forward reciprocation of the feed carriage 21 and eject waste stock material from the die set when the last lid 103 has been formed from the strip 19. Thereafter, on the next reciprocation of the feed carriage, the feed fingers will engage the apertures formed in the leading edge of the next strip of stock material 19 and will again perform the function of positively indexing the strip of stock from station to station within the die set.

During rearward travel of the feed carriage, the feed fingers ride out of the apertures in the stock against the biasing action of the springs 95 and the protruding lip 101 of the fingers slides across the surface of the stock 19. When the feed carriage reaches its rearward position the fed fingers 43, 45 are in alignment with the next set of apertures 27, 29 whereupon the springs 95 bias the arms 39, 41 about the pins 89 and the feed fingers 43, 45 are urged into the apertures 27, 29 in the stock.

It can be seen that an apparatus has been provided for feeding strip stock into a progressive die set in correct registry with the die set. The distance of travel of the feed carriage may be adjusted so that the feed carriage can advance the strip stock into the stamping apparatus the correct distance. The die set is then provided with punches for providing apertures in the stock at a specific location and feed fingers connected to the feed carriage by suitable slides are provided for engagement with the apertures. Thus, the forward travel of the feed fingers, during the forward travel of the feed carriage, indexes the strip stock forward the required distance to index the strip stock from station to station within the die set. Accordingly, by suitable adjustment of the length of the slides and the location of the punches for forming apertures in the stock, the positive indexing of the stock material through the die set in correct registry with the die set may be readily achieved.

It is apparent that the described advancing means may also be employed to feed a continuous web of stock material into a stamping press or other forming apparatus. When the stock is in the form of a continuous web, the illustrated reciprocating feed carriage is not needed, the stock being fed to the press by suitable feed rollers from a coil of stock material.

The feed fingers may be connected by suitable gearing to the press drive train in order to cause the feed fingers to travel in a reciprocatory path to advance the stock material from station to station within the progressive die set. When the coil of stock is initially fed into the die set the stock will have to be advanced through the die set manually, or by some other advancing means, until the front edge of the stock has passed through the die set, at which point the feed fingers will engage the apertures in the stock to advance the stock through the press.

It is to be understood that various modifications of the apparatus and methods described herein may be made without departing from the spirit of the invention. For example, it is not necessary to utilize two feed fingers, as a centrally located feed finger may be utilized with equally desirable results. Further, it may not be necessary to form special apertures in the stock material for engagement with the feed fingers inasmuch as in many instances it may be possible for the feed fingers to engage an aperture in the stock formed during blanking of the product. Additionally, it is not considered to be necessary that the feed fingers be attached to the feed carriage, and the feed fingers may be attached through a suitable linkage to the ram of the press or other device. The only criteria is that the feed fingers be regulated so as to index the stock forward between each stroke of the press.

Various features of the invention are set forth in the following claims.

What is claimed is:

1. A method of performing work on strip stock in at least two separate operations comprising providing a work device having a stock entry end and first and second work stations, said first work station being located between said stock entry end and said second work station, introducing into said device one end of an elongated generally planar uncoiled strip of stock so as to position a given portion of said strip within said first work station, performing work on said given portion of said strip at said first station, advancing said stock a predetermined increment so as to locate said given portion of said strip in a predetermined position within said second station by engaging the edge of said strip opposite the said one end and applying a pushing force thereto, performing work on said given portion of said strip at said second station, providing an aperture in said strip at one of said first and second stations during the performance of work on said strip at said one station, and advancing said strip by inserting a finger in said aperture and applying a pulling force to said strip after the edge of the strip opposite the one end has been advanced to said first station.

2. A method in accordance with claim 1, wherein said strip is initially introduced into said device by engaging the edge thereof opposite the said one end and applying a pushing force thereto.

3. A method in accordance with claim 1, wherein said device is caused to perform work at said first station on a portion of said strip adjacent said given portion when performing work on said given portion at said second station.

4. A method in accordance with claim 1, wherein said aperture is provided at said second station.

5. An apparatus for feeding an elongated generally planar uncoiled strip of stock to a work device, said apparatus comprising means engaging the lateral edge portions of the strip to support and guide same during longitudinal advancing movement, a carriage mounted for reciprocal movement parallel to said supporting and guiding means and adjacent thereto, pusher means mounted on said carriage for engagement with the end edge of the strip to advance same a predetermined increment as said carriage reciprocates in one direction, and finger means mounted on said carriage for insertion into an aperture in the strip for advancing the strip as said carriage reciprocates in said one direction.

6. An apparatus in accordance with claim 5, wherein said pusher means and said finger means are spaced a fixed predetermined distance from each other on said carriage.

7. An apparatus in accordance with claim 5, wherein means are provided for forming an aperture in the strip at a fixed predetermined distance from the trailing edge of the strip.

8. An apparatus in accordance with claim 5, wherein said means is adapted to form an aperture having a leading edge spaced from the trailing edge of the strip a distance equal to a multiple of the increment of advance.

9. The combination of the apparatus set forth in claim 5 and a work device having a stock entry end and first and second work stations, said first work station being located between said stock entry end and said second work station.

References Cited

UNITED STATES PATENTS

| 2,321,788 | 6/1943 | Anderson | 83—278 |
|---|---|---|---|
| 2,415,866 | 2/1947 | Braun | 214—1 |
| 2,614,515 | 10/1952 | Wheeler | 72—344 |
| 2,779,590 | 1/1957 | Seastrom | 83—278 |
| 3,155,241 | 11/1964 | Suofy | 214—1 |
| 3,203,692 | 8/1965 | Kidd | 214—1.7 |
| 3,233,750 | 2/1966 | Bannon | 214—1 |

RICHARD J. HERBST, *Primary Examiner.*

E. M. COMBS, *Assistant Examiner.*